US010069342B2

(12) United States Patent
Jeong et al.

(10) Patent No.: US 10,069,342 B2
(45) Date of Patent: Sep. 4, 2018

(54) POWER SUPPLY APPARATUS (71) Applicant: Samsung Electro-Mechanics Co., Ltd., Suwon-si (KR)

(72) Inventors: In Wha Jeong, Suwon-si (KR); Jong Heum Park, Suwon-si (KR); Hugh Kim, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 568 days.

(21) Appl. No.: 14/658,704

(22) Filed: Mar. 16, 2015

(65) Prior Publication Data

US 2016/0105033 A1    Apr. 14, 2016

(30) Foreign Application Priority Data

Oct. 10, 2014    (KR) .................. 10-2014-0136737

(51) Int. Cl.
*H01F 27/42*     (2006.01)
*H02J 50/12*     (2016.01)

(52) U.S. Cl.
CPC .................. *H02J 50/12* (2016.02)

(58) Field of Classification Search
None
See application file for complete search history.

(56) References Cited

U.S. PATENT DOCUMENTS

| 8,598,744 | B2 * | 12/2013 | Choi | H01Q 7/00 |
| | | | | 307/104 |
| 9,358,684 | B1 * | 6/2016 | He | H04B 1/40 |
| 2009/0108680 | A1 * | 4/2009 | Minemura | H02J 9/005 |
| | | | | 307/104 |
| 2010/0067197 | A1 * | 3/2010 | Guccione | G06F 1/1632 |
| | | | | 361/728 |
| 2011/0037863 | A1 * | 2/2011 | Mihota | G03B 17/00 |
| | | | | 348/208.99 |
| 2013/0127405 | A1 | 5/2013 | Scherer et al. | |
| 2013/0278207 | A1 | 10/2013 | Yoo | |

(Continued)

FOREIGN PATENT DOCUMENTS

| JP | 2013-110915 A | 6/2013 |
| JP | 2014-171371 A | 9/2014 |

(Continued)

OTHER PUBLICATIONS

Korean Office Action dated Apr. 14, 2016 in counterpart Korean Application No. 10-2014-0136737 (12 pages in Korean with English translation).

*Primary Examiner* — Lincoln Donovan
*Assistant Examiner* — Khareem E Almo
(74) *Attorney, Agent, or Firm* — NSIP Law (57) ABSTRACT A power supply apparatus for supplying power in a wireless manner or a wired-wireless manner is provided. The power supply apparatus includes a power conversion unit converting input power into first power, and a wireless power supply unit varying a switching frequency switching the first power to wirelessly transmit the switched first power in one of a first wireless transmission manner or a second wireless transmission manner or wirelessly transmit the switched first power at a frequency within a resonance frequency band of one wireless transmission manner of wireless transmission manners having different resonance frequency bands.

12 Claims, 7 Drawing Sheets

(56) References Cited

U.S. PATENT DOCUMENTS

| | | | | |
|---|---|---|---|---|
| 2014/0132475 A1* | 5/2014 | Bhutani | .................. | H01F 38/14 |
| | | | | 343/866 |
| 2014/0210406 A1 | 7/2014 | Na et al. | | |
| 2015/0035373 A1* | 2/2015 | Chen | .................... | H04B 5/0037 |
| | | | | 307/104 |
| 2015/0263535 A1* | 9/2015 | Bae | ........................ | H02J 5/005 |
| | | | | 307/104 |
| 2015/0280450 A1* | 10/2015 | Park | ........................ | H02J 7/025 |
| | | | | 307/104 |
| 2016/0013658 A1 | 1/2016 | Kohara et al. | | |
| 2016/0105033 A1* | 4/2016 | Jeong | ...................... | H02J 50/12 |
| | | | | 307/104 |
| 2016/0241085 A1* | 8/2016 | Park | ........................ | H02J 50/80 |

FOREIGN PATENT DOCUMENTS

| | | |
|---|---|---|
| KR | 10-2008-0032519 A | 4/2008 |
| KR | 10-2013-0054897 A | 5/2013 |
| KR | 10-2013-0118413 A | 10/2013 |
| KR | 10-2014-0053758 A | 5/2014 |
| WO | WO 2008/044875 A1 | 4/2008 |

\* cited by examiner

POWER SUPPLY APPARATUS

CROSS-REFERENCE TO RELATED APPLICATION

This application claims priority to, and the benefit of, Korean Patent Application No. 10-2014-0136737 filed on Oct. 10, 2014, with the Korean Intellectual Property Office, the disclosure of which is incorporated herein by reference.

BACKGROUND

The present disclosure relates to a power supply apparatus for supplying power in a wireless manner or a wired-wireless manner.

In general, in order for an electronic apparatus to receive externally-supplied power, a power supply apparatus for transferring power from a power outlet to the electronic apparatus is employed.

In general, a wired power supply apparatus, which is directly connected to the electronic apparatus by a connector (a recharging cable), or the like, is mainly used to supply power to a charger embedded in the electronic apparatus. However, a wired power supply apparatus has several limitations due to the need for power to be supplied via a cable.

Therefore, as described in the following Related Art Document, power may be supplied to the charger embedded in the electronic apparatus in a non-contact manner by a magnetic induction effect or a magnetic resonance effect.

However, since the power supply apparatus according to the related art supplies the power in the wired manner, or a wireless manner by one of a magnetic induction effect or a magnetic resonance effect, it may be difficult to supply power to different types of devices (requiring various types of cable connection), and in addition, it may be difficult to simultaneously supply power to a plurality of devices.

RELATED ART DOCUMENT (Patent Document 1) Korean Patent Laid-Open Publication No. 2013-0054897

SUMMARY

An aspect of the present disclosure may provide a power supply apparatus capable of wirelessly transmitting power at one frequency among a plurality of resonance frequencies.

According to an aspect of the present disclosure, a power supply apparatus may include a power conversion unit converting input power into first power, and a wireless power supply unit varying a switching frequency switching the first power and wirelessly transmitting the switched first power in one of a first wireless transmission manner or a second wireless transmission manner or wirelessly transmit the switched first power at a frequency within a resonance frequency band of one wireless transmission manner of wireless transmission manners having different resonance frequency bands.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIGS. 1A through 1E are diagrams illustrating examples of utilizing a power supply apparatus according to an exemplary embodiment of the present disclosure.

Referring to FIGS. 1A through 1E, a power supply apparatus 100 according to an exemplary embodiment of the present disclosure may be a power supply apparatus that supplies power in a wired manner, and may supply the power to a laptop personal computer (PC) B and C in the wired manner while wirelessly supplying the power to a cellular phone A at the same time. In this case, the power supply apparatus 100 according to the exemplary embodiment of the present disclosure may be a wireless charging pad capable of wirelessly supplying the power to the cellular phone A.

Thereafter, in the case in which the laptop PC B and C may be separated into a body B and a display C, the power supply apparatus 100 may supply the power to the body B in the wired manner while wirelessly supplying the power to the display C, and may wirelessly supply the power to the body B and the display C, respectively.

In addition, since the power supply apparatus 100 may supply the power to the cellular phone A in the wired manner, and a wireless manner of a magnetic resonance manner or a magnetic induction manner, it may perform a fast charging while charging the cellular phone or supplement a case in which charging power is insufficient.

In addition, in the case in which a plurality of transmission coils are provided, the power supply apparatus 100 may wirelessly supply the power in the magnetic resonance manner or the magnetic induction manner, and may also transmit the power the body B and the display C as well as the cellular phone A.

A configuration of the power supply apparatus 100 according to the exemplary embodiment of the present disclosure for those described above will be described with reference to the drawings.

Figure 1A:
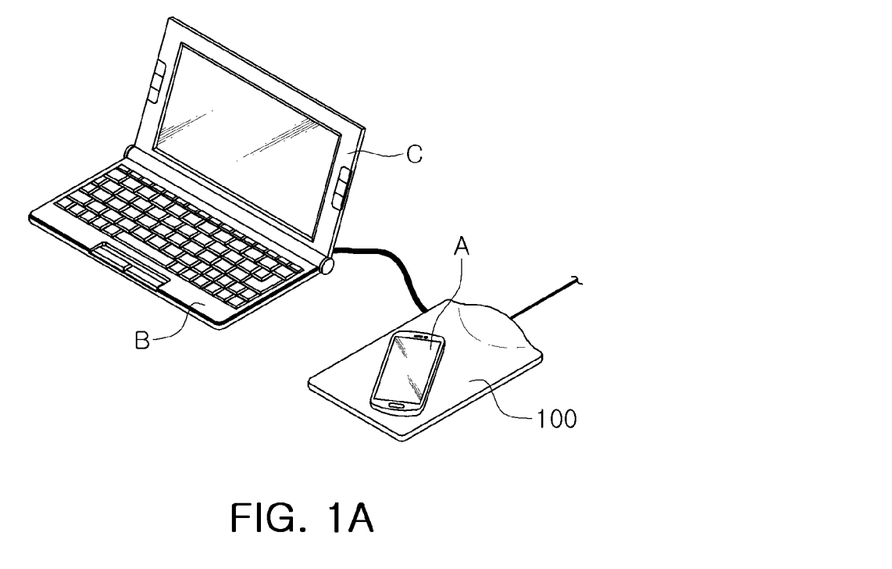
FIGS. 1A through 1E are diagrams illustrating examples of utilizing a power supply apparatus according to an exemplary embodiment of the present disclosure.
Figure 1B:
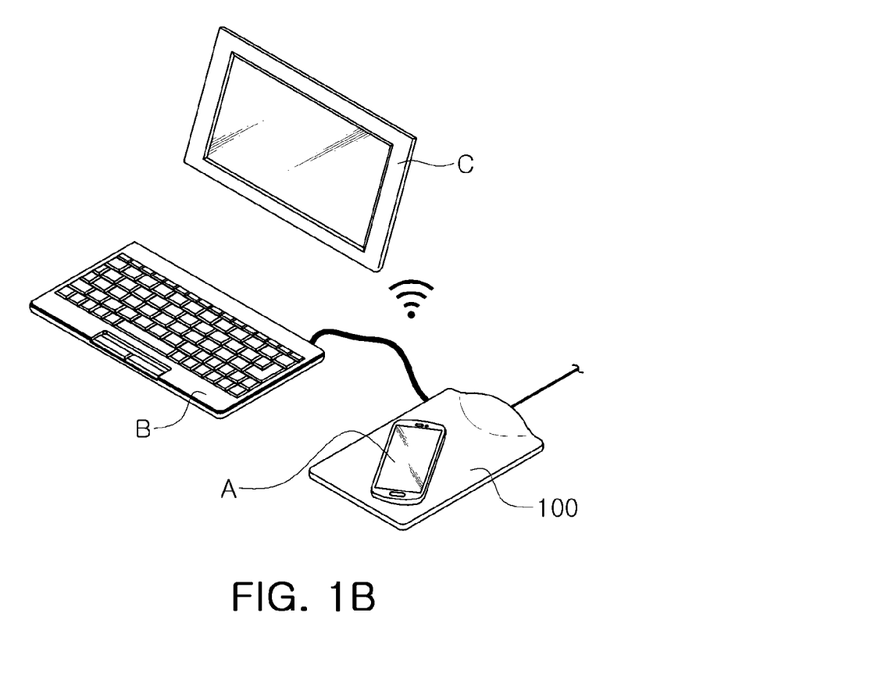
Figure 1C:
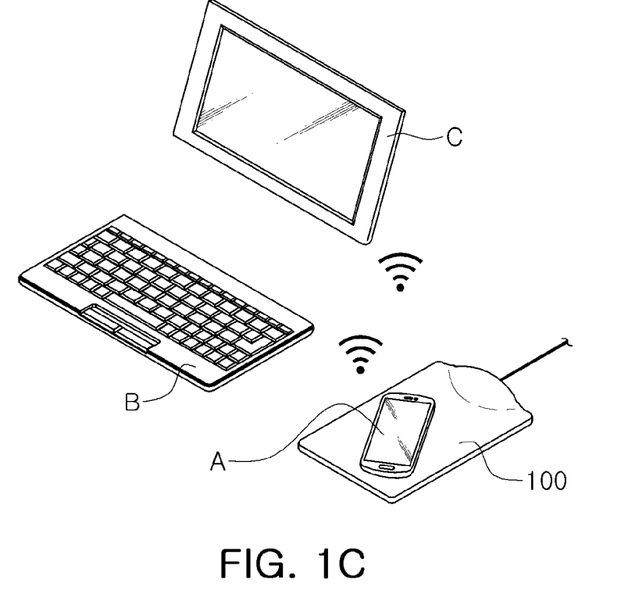
Figure 1D:
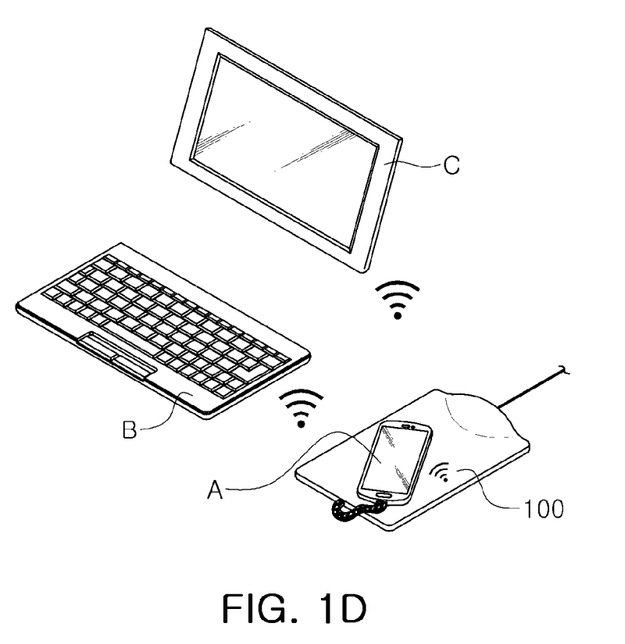
Figure 1E:
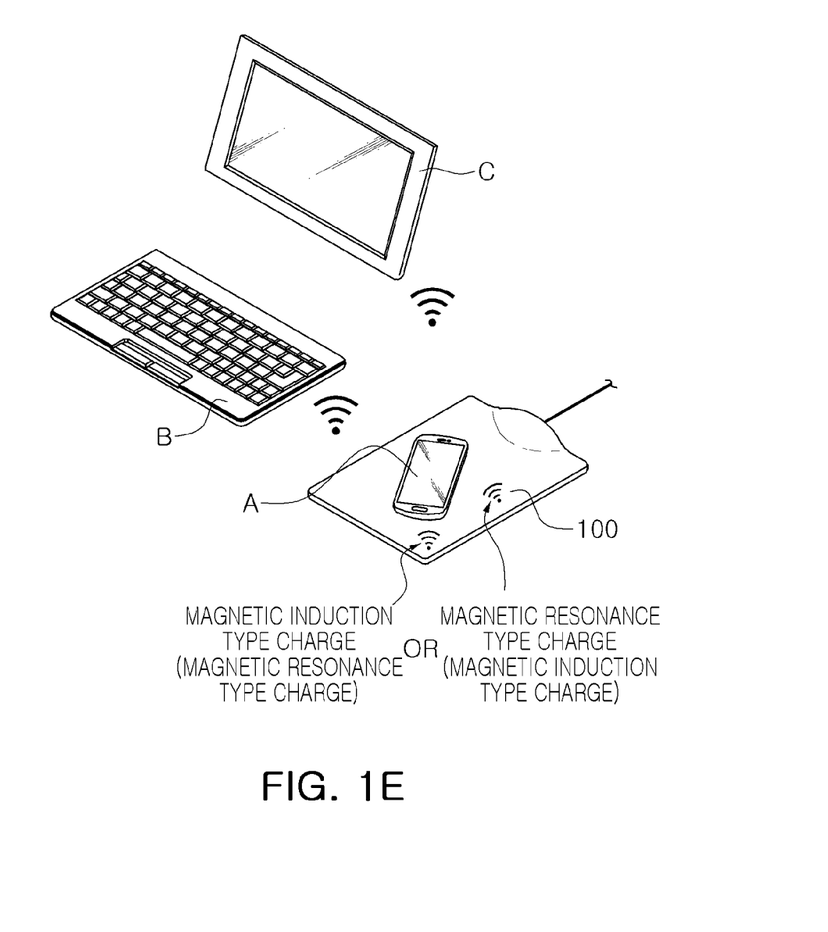
Figure 2A:
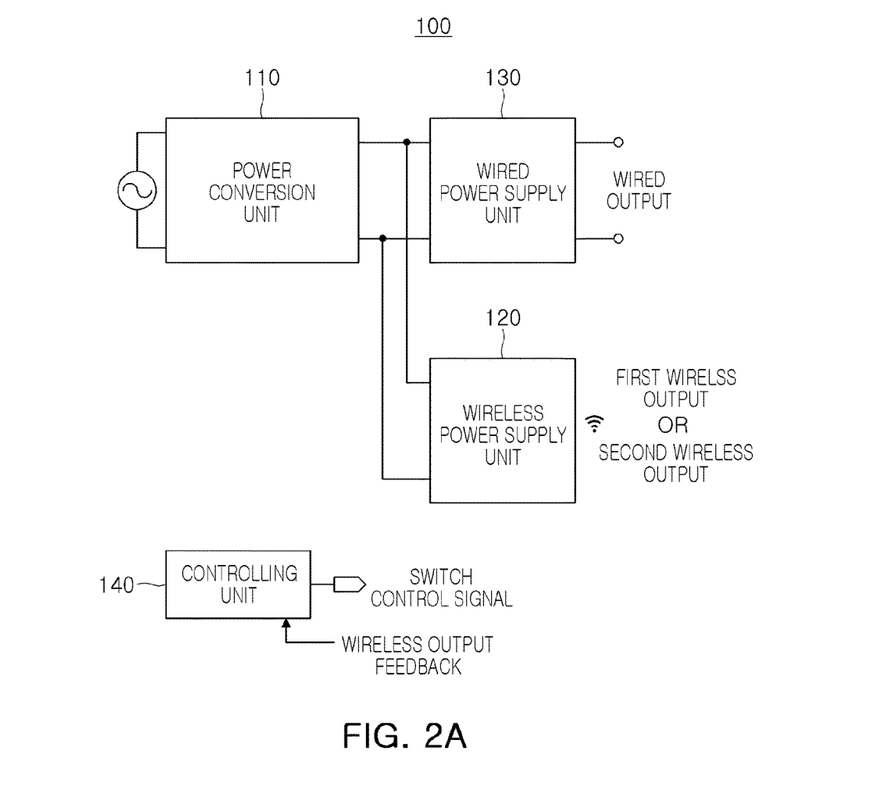
FIGS. 2A and 2B are block diagrams schematically illustrating examples of the power supply apparatus according to exemplary embodiments of the present disclosure.
Figure 2B:
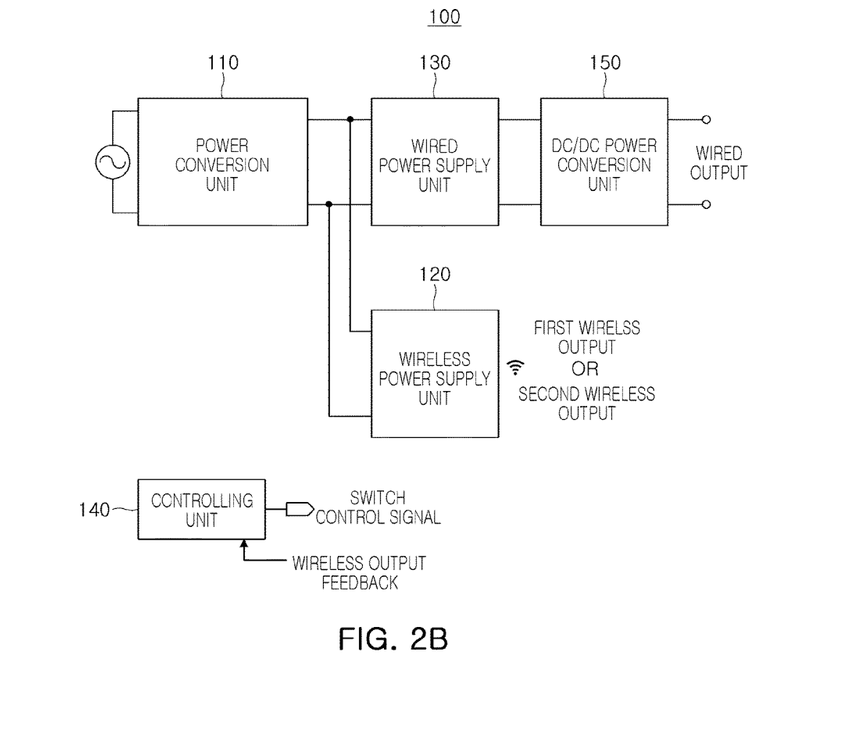

FIGS. 2A and 2B are block diagrams schematically illustrating examples of the power supply apparatus according to exemplary embodiments of the present disclosure.

Referring to FIG. 2A, the power supply apparatus 100 according to the exemplary embodiment of the present disclosure may include a power conversion unit 110 converting input power or alternating current power into first power, a wireless power supply unit 120 switching the first power from the power conversion unit 110 so as to wirelessly transmit the switched first power, a wired power supply unit 130 transferring the first power from the power conversion unit 110 in a wired manner, and a controlling unit 140 controlling the wireless transmission of the wireless power supply unit 120.

Referring to FIG. 2B, in addition to the configuration described above, the power supply apparatus 100 may further include a direct current (DC) to direct current (DC) converting unit 150 performing a DC to DC conversion for the power transferred to the wired power supply unit 130.

Figure 3:
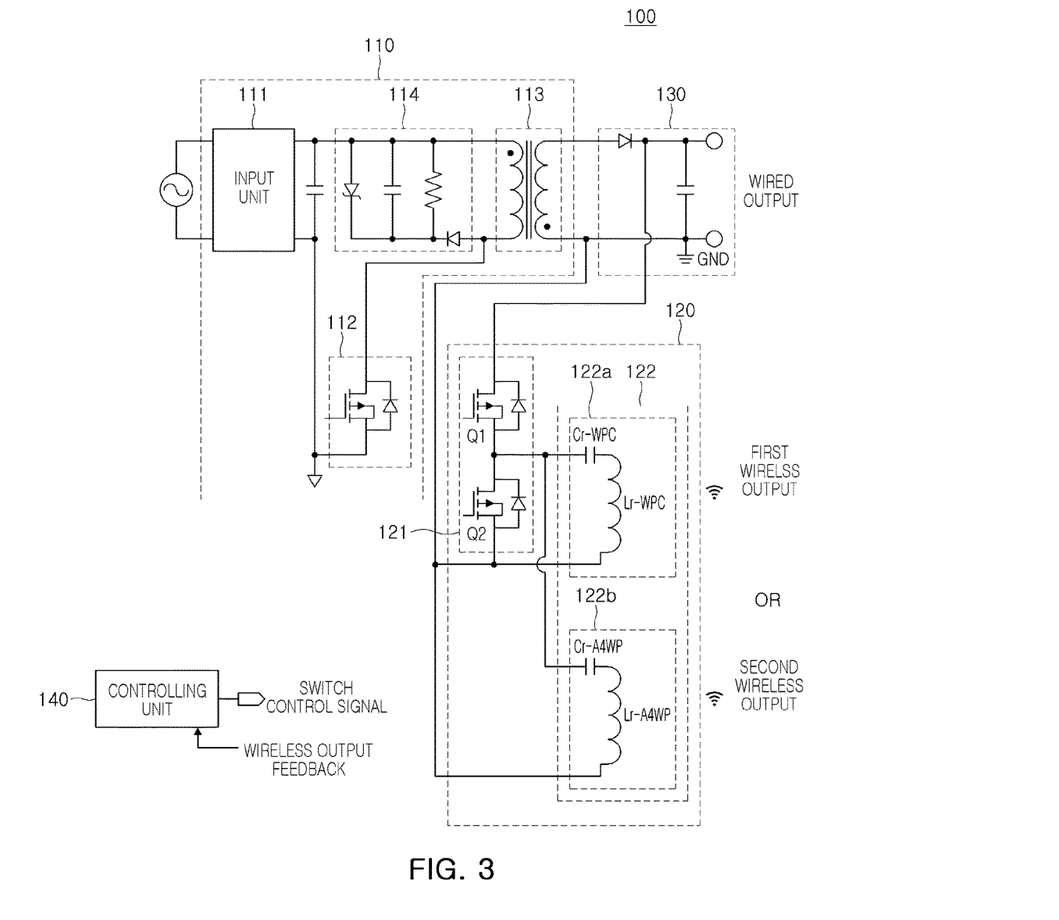
FIG. 3 is a circuit diagram schematically illustrating an example of the power supply apparatus according to the exemplary embodiment of the present disclosure.

FIG. 3 is a circuit diagram schematically illustrating an example of the power supply apparatus according to the exemplary embodiment of the present disclosure.

Referring to FIG. 3, an example of the power supply apparatus 100 according to the exemplary embodiment of the present disclosure may include the power conversion unit 110, the wireless power supply unit 120, the wired power supply unit 130, and the controlling unit 140.

The power conversion unit 110 may include an input unit 111, a power switching unit 112, a transformer 113, and a peripheral circuit 114.

The input unit 111 may rectify alternating current (AC) power input or suppress electromagnetic interference, the rectified power may be switched by the power switching unit 112 having at least one switch, the transformer 113 may include a primary winding and a secondary winding that are insulated from each other and are magnetically coupled to each other, the primary winding may receive the switched power, and the secondary winding may transform the switched power received by the primary winding depending on a turns ratio with the primary winding, so as to output the first power. The peripheral circuit 114 may perform power stabilization and snubber operations at the time of the power switching by the power switching unit 112.

The wireless power supply unit 120 may include a switching unit 121 and a resonance unit 122.

The switching unit 121 may include one or more switches Q1 and Q2, and may be a single half-bridge switch having a first switch Q1 and a second switch Q2.

The first and second switches Q1 and Q2 of the half-bridge switch may perform complementary ON/OFF switching of the first power from the power conversion unit 110, and the resonance unit 122 may resonate according to a switching frequency of the half-bridge switch and may resonate at one resonance frequency of at least two resonance frequencies. Here, the resonance frequency may be linked to the switching frequency of the half-bride switch.

The resonance unit 122 may include a first resonance unit 122a and a second resonance unit 122b.

The first resonance unit 122a may have a first capacitor Cr-WPC and a first power transmission coil Lr-WPC, and the second resonance unit 122b may include a second capacitor Cr-A4WP and a second power transmission coil Lr-A4WP.

One terminal of the first capacitor Cr-WPC of the first resonance unit 122a may be connected to a connection point between the first switch Q1 and the second switch Q2, and the other terminal of the first capacitor Cr-WPC may be connected in series with the first power transmission coil Lr-WPC. The first power transmission coil Lr-WPC may be connected between the other terminal of the first capacitor Cr-WPC and a ground.

One terminal of the second capacitor Cr-A4WP of the second resonance unit 122b may be connected to the connection point between the first switch Q1 and the second switch Q2, and the other terminal of the second capacitor Cr-A4WP may be connected in series with the second power transmission coil Lr-A4WP. The second power transmission coil Lr-A4WP may be connected between the other terminal of the second capacitor Cr-A4WP and the ground.

The wired power supply unit 130 may stabilize the first power from the power conversion unit 110 and may then supply the first power to the outside in the wired manner.

The controlling unit 140 may vary the switching frequency of the switching unit 121 depending on a choice of a user, and consequently, the resonance frequency of the resonance unit 122 may be varied. The controlling unit 140 may vary the switching frequency of the switching unit 121 by receiving a feedback of information on an output current of the wireless power supply unit 120.

Figure 4:
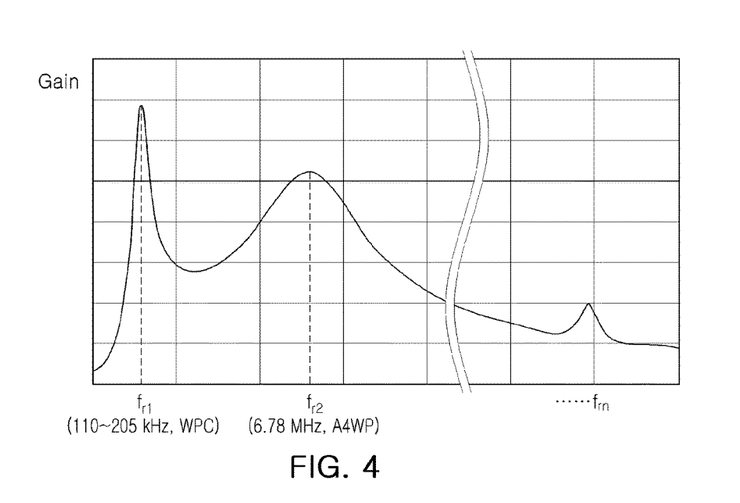
FIG. 4 is a graph illustrating a resonance frequency of the power supply apparatus according to the exemplary embodiment of the present disclosure.

FIG. 4 is a graph illustrating a resonance frequency of the power supply apparatus according to the exemplary embodiment of the present disclosure.

As illustrated in FIGS. 3 and 4, the power supply apparatus 100 according to an exemplary embodiment of the present disclosure may wirelessly transmit the power at one resonance frequency of a plurality of resonance frequencies. For example, as described above, the resonance unit 122 may wirelessly transmit the power at a frequency within one frequency band of a first resonance frequency band and a second resonance frequency band, and may form at least two resonance frequency bands in one resonance circuit as illustrated in FIG. 4.

For example, the first resonance frequency band fr1 (here, fr1 is a center frequency within the frequency band) may be formed in the range of about 110 kHz to 205 kHz by a WPC standard scheme, and the first resonance unit 122a of the resonance unit 122 may wirelessly transmit the power in the magnetic induction manner at a frequency within the first resonance frequency band fr1.

The resonance frequency described above may be formed by an LC resonance of the first resonance unit 122a and may be linked to the switching frequency of the switching unit 121. The switching frequency may be varied according to a control of the controlling unit 140, and consequently, the resonance frequency may be varied within the first resonance frequency band fr1.

The resonance frequency fr1 may be formed according to the following Equation 1.

$$f_{r1} = \frac{1}{2\pi\sqrt{L_{r-WPC} \cdot C_{r-WPC}}} \quad \text{(Equation 1)}$$

(where, Lr-WPC represents inductance of the first power transmission coil of the first resonance unit 122a and Cr-WPC represents capacitance of the first capacitor of the first resonance unit 122a.)

On the other hand, the second resonance frequency fr2 (here, fr2 is a center frequency within the frequency band) may have a frequency band of 6.78 MHz by an A4WP standard scheme, and the resonance unit 122 may wirelessly transmit the power in the magnetic resonance manner.

The resonance frequency fr2 may be formed according to the following Equation 2.

$$f_{r2} = \frac{1}{2\pi\sqrt{L_{r-A4WP} \cdot C_{r-A4WP}}} \quad \text{(Equation 2)}$$

(where, Lr-A4WP represents inductance of the second power transmission coil of the second resonance unit 122b and Cr-A4WP represents capacitance of the second capacitor of the second resonance unit 122b.)

In addition, as described in relation to FIG. 4, a plurality of resonance frequency bands fr1, fr2, and frn (here, each of fr1, fr2, and frn is the center frequency of each frequency band) may also be formed.

Figure 5:
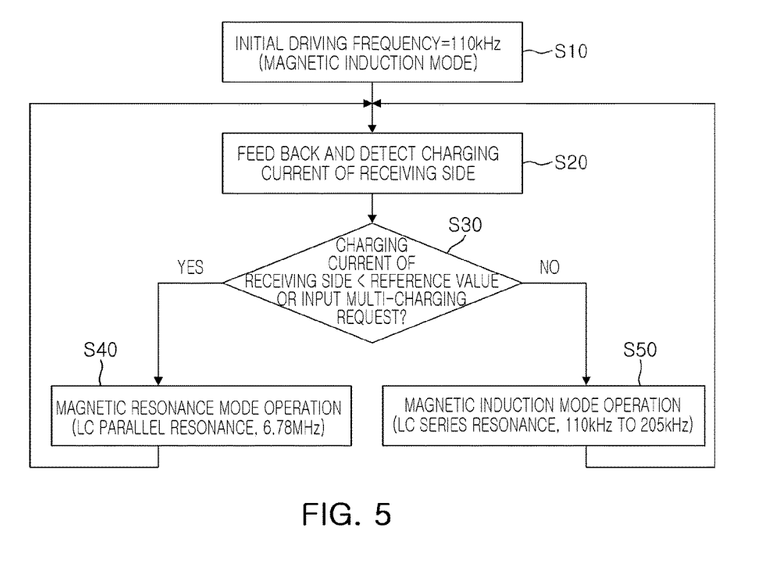
FIG. 5 is an operation flow chart of the power supply apparatus according to the exemplary embodiment of the present disclosure.

FIG. 5 is an operation flow chart of the power supply apparatus according to the exemplary embodiment of the present disclosure.

Referring to FIG. 5, the controlling unit 140 in an example of the power supply apparatus 100 according to the exemplary embodiment of the present disclosure may first control wireless transmission of power at the first resonance frequency band, for example, a resonance frequency having one frequency value in the range of 110 kHz to 205 kHz at the initial operation, and in other words, may wirelessly transmit the power in a magnetic induction mode (S10).

Although not illustrated, in some cases, the controlling unit 140 may control the wireless transmission at a second resonance frequency, for example, a resonance frequency of 6.78 MHz, and in other words, may wirelessly transmit the power in a magnetic resonance mode.

Next, if a charging current of a receiving side is fed back and detected (S20), the charging current of the receiving side and a preset reference value may be compared with each other. As the comparison result, due to an increased distance between the power supply apparatus and a device, if the charging current of the receiving side is lower than the reference value, or a multi-charging request is input (S30), the controlling unit 140 may control the wireless transmission of the power at a second resonance band, for example, a frequency of a resonance frequency band having the center frequency of 6.78 MHz, and in other words, may wirelessly transmit the power in the magnetic resonance mode (S40).

If the charging current of the receiving side is the reference value or more, or the multi-charging request is not input (S30), the controlling unit 140 may control the wireless transmission of the power at a first resonance band, for example, a frequency of a resonance frequency band of 110 kHz to 205 kHz, and in other words, may wirelessly transmit the power in the magnetic induction mode (S50).

As set forth above, according to exemplary embodiments of the present disclosure, since the power may be wirelessly transmitted using one resonance frequency of at least two resonance frequencies and the power may also be individually or simultaneously supplied to various devices by the wired manner and the wireless manner which are integrated, the power may be supplied or charged to various devices and may be rapidly charged to one device.

As set forth above, according to exemplary embodiments of the present disclosure, the power may be wirelessly transmitted at the frequency of one resonance frequency band of at least two resonance frequency bands, and in addition to this, the wired manner and the wireless manner are integrated, whereby the power may be individually or simultaneously supplied to various devices.

While exemplary embodiments have been shown and described above, it will be apparent to those skilled in the art that modifications and variations could be made without departing from the scope of the present invention as defined by the appended claims.

What is claimed is:

1. A power supply apparatus comprising:
   a power conversion unit converting input power into first power; and
   a wireless power supply unit varying a switching frequency that the first power is switched and wirelessly transmitting the switched first power in one of a first wireless transmission manner or a second wireless transmission manner different from the first wireless transmission manner,
   wherein the wireless power supply unit comprises
      a switching unit having at least one switch switching the first power from the power conversion unit; and
      a resonance unit wirelessly transmitting the switched power via a resonance frequency of the resonance unit according to the switching of the switching unit, and
   wherein the resonance unit includes a first resonance unit which transmits the switched first power in the first wireless transmission manner and a second resonance unit which transmits the switched first power in the second wireless transmission manner, the first resonance unit and the second resonance unit are respectively connected to a connection point between a first switch and a second switch of the switching unit and selectively resonated according to the switching frequency.

2. The power supply apparatus of claim 1, further comprising a controlling unit selecting one frequency among a plurality of resonance frequencies by varying the switching frequency according to feedback information of the power wirelessly transmitted by the wireless power supply unit.

3. The power supply apparatus of claim 1, wherein the first switch and the second switch constitute a half bridge switch circuit.

4. The power supply apparatus of claim 1, wherein the first resonance unit includes a first capacitor connected to the connection point between the first switch and the second switch, and a first power transmission coil connected to the first capacitor in series, and
   the second resonance unit includes a second capacitor connected to the connection point between the first switch and the second switch, and a second power transmission coil connected to the second capacitor in series.

5. The power supply apparatus of claim 1, further comprising a direct current (DC) to direct current (DC) converting unit performing a DC to DC conversion on the power from the wired power supply unit and transmitting the converted power in the wired manner.

6. A power supply apparatus comprising:
   a power conversion unit converting input power into first power; and
   a wireless power supply unit varying a switching frequency that the first power is switched and wirelessly transmitting the switched first power at a frequency within a resonance frequency band of one wireless transmission manner of wireless transmission manners having different resonance frequency bands,
   wherein the wireless power supply unit comprises
      a switching unit having at least one switch switching the first power from the power conversion unit; and a resonance unit wirelessly transmitting the switched power via a resonance frequency of the resonance unit according to the switching of the switching unit, and wherein the resonance unit includes a first resonance unit which has a resonance frequency within a first resonance frequency band and a second resonance unit which has a resonance frequency within a second resonance frequency band different from the first resonance frequency band, the first resonance unit and the second resonance unit are respectively connected to a connection point between a first switch and a second switch of the switching unit and selectively resonated according to the switching frequency.

7. The power supply apparatus of claim 6, further comprising a controlling unit selecting one frequency among a plurality of resonance frequencies by varying the switching frequency according to feedback information of the power wirelessly transmitted by the wireless power supply unit.

8. The power supply apparatus of claim 6, wherein the first switch and the second switch constitute a half bridge switch circuit.

9. The power supply apparatus of claim 6, wherein the first resonance unit includes a first capacitor connected to the connection point between the first switch and the second switch, and a first power transmission coil connected to the first capacitor in series, and the second resonance unit includes a second capacitor connected to the connection point between the first switch and the second switch, and a second power transmission coil connected to the second capacitor in series.

10. The power supply apparatus of claim 6, further comprising a direct current (DC) to direct current (DC) converting unit performing a DC to DC conversion on the power from the wired power supply unit and transmitting the converted power in the wired manner.

11. The power supply apparatus of claim 1, further comprising a wired power supply unit stabilizing the first power from the power conversion unit and transmitting the first power in a wired manner.

12. The power supply apparatus of claim 6, further comprising a wired power supply unit stabilizing the first power from the power conversion unit and transmitting the first power in a wired manner.

* * * * *